United States Patent
Zheng et al.

(10) Patent No.: US 11,713,372 B2
(45) Date of Patent: Aug. 1, 2023

(54) DISPERSING RESIN, UNIVERSAL COLOR PASTE USED FOR IMPREGNATING COATING AND PREPARATION METHOD THEREFOR

(71) Applicant: Zhejiang Rongtai Technical Industry Co., Ltd., Zhejiang (CN)

(72) Inventors: Minmin Zheng, Zhejiang (CN); Fan Ge, Zhejiang (CN); Liyi Yang, Zhejiang (CN); Yuan Cao, Zhejiang (CN); Bin Shen, Zhejiang (CN); Tao Ran, Zhejiang (CN)

(73) Assignee: Zhejiang Rongtai Technical Industry Co., Ltd., Jiaxing (CN)

( * ) Notice: Subject to any disclaimer, the term of this patent is extended or adjusted under 35 U.S.C. 154(b) by 341 days.

(21) Appl. No.: 17/008,606

(22) Filed: Aug. 31, 2020

(65) Prior Publication Data
US 2021/0363292 A1    Nov. 25, 2021

(30) Foreign Application Priority Data
May 20, 2020 (CN) ............ 202010433139.0

(51) Int. Cl.
*C08G 63/181* (2006.01)
*C08G 63/81* (2006.01)
*C08K 13/02* (2006.01)

(52) U.S. Cl.
CPC .......... *C08G 63/181* (2013.01); *C08G 63/81* (2013.01); *C08K 13/02* (2013.01)

(58) Field of Classification Search
CPC .................. C08G 63/181; C08G 63/81
See application file for complete search history.

(56) References Cited

FOREIGN PATENT DOCUMENTS

| CN | 109111792 A | | 1/2019 | |
| CN | 110563889 A | * | 12/2019 | ............ C08F 283/01 |

OTHER PUBLICATIONS

Machine translation of CN-110563889-A (Year: 2019).*

* cited by examiner

*Primary Examiner* — Wenwen Cai

(57) ABSTRACT

The present application relates to a dispersing resin, a universal color paste used for impregnating coating, and a preparation method therefor. The dispersing resin is prepared from a raw material including: diol, polyol, aromatic dicarboxylic acid, anhydride, maleic anhydride, polymerization inhibitor, reactive diluent, and azeotropic solvent.

1 Claim, No Drawings

DISPERSING RESIN, UNIVERSAL COLOR PASTE USED FOR IMPREGNATING COATING AND PREPARATION METHOD THEREFOR

CROSS-REFERENCE TO RELATED APPLICATION

This application claims a priority to Chinese Patent Application No. 202010433139.0 filed on May 20, 2020. The entirety of the above-mentioned patent application is incorporated herein by reference and made a part of this specification.

BACKGROUND

Technical Field

The present application relates to the field of insulation impregnating material, and in particular, to a dispersing resin, a universal color paste used for a impregnating coating and preparation method therefor.

Description of Related Art

A coating used for impregnating or casting a winding in an electronic part, a voltage transformer or an engine is usually an unsaturated resin-based composition, which often comprises a reactive diluent such as ethylenically unsaturated monomer, for example, styrene, vinyl toluene, acrylates, or methacrylates. Cured impregnating coating has the functions of mechanical fixing, preventing external heat impact and chemical corrosion and providing electrical insulation. In particular, as required by the heat resistance of an electric product, the thermal conductivity of a impregnating coating product has to be improved, which is generally achieved based on a filler contained therein. This leads to the need of a semi-finished slurry containing a filler, and, under some special circumstances, the need of the color of the impregnating coating, that is, a need of preparing semi-finished slurries having different colors. The production of a semi-finished slurry, i.e., a semi-finished product of a color paste, is becoming more and more important in the filed of a impregnating coating.

At present, a single-color paste grinding method is usually adopted by an industrial coating company for producing a color paste, which however suffers from some intrinsic problems, for example, complicated production, increased inventory, and difficult managements. A universal color paste for color matching can be used for addressing such problems. However, A universal color paste is not started to be used in the field of a impregnating coating. Therefore, there is a need for a dispersing resin having high dispersivity and good compatibility.

SUMMARY

In a first aspect, the present application provides a dispersing resin, which has good compatibility with a plurality of commonly used impregnating matrix resins. When being used for grinding pigments commonly used for impregnating coatings, such resins exhibit good dispersivity and wide universality, meeting the requirements for a universal color paste used for a impregnating coating.

In one embodiment, the present application provides a dispersing resin prepared from a raw material including by weight parts: 10-30 parts of diol, 5-20 parts of polyol, 10-30 parts of aromatic dicarboxylic acid and anhydride, 5-25 parts of maleic anhydride, 0.01-0.1 parts of polymerization inhibitor, 20-60 parts of reactive diluent, and 1-10 parts of azeotropic solvent. In one embodiment, the dispersing resin has an aliphatic acid value of smaller than 10 mgKOH/g. In another embodiment, the viscosity of a resin solution obtained by mixing the dispersing resin and the reactive diluent is in the range of 800-2500 mPas.

An unsaturated polyester resin prepared by a polycondensation reaction from an aromatic dicarboxylic acid and an anhydride (for example, maleic anhydride) with a diol or a polyol has a plurality of branched chains in the main chain, and thus has a high degree of branching.

In addition, the functional groups in the main chain and the branched chains, for example, a hydroxyl group, a carboxyl group, ester bond, or an anhydride, are substantially the same as the functional groups in most of impregnating polymer resins, for example, a hydroxyl group, a carboxyl group, an ester bond, an anhydride, or an ether bond, and thus large amount of hydrogen bonding points can be formed between a highly branched polyhydroxyl structure and a impregnating polymer resin, so as to have good compatibility with a plurality of matrix resin commonly used in the field of impregnating coatings, for example, vinyl unsaturated resins or epoxy resins. When being used for grinding pigments commonly used for impregnating coatings, such resins exhibit good dispersivity and wide universality, meeting the requirements for a universal color paste used for a impregnating coating.

By controlling the amounts of diol, polyol, aromatic dicarboxylic acid, anhydride and maleic anhydride to control the ratio of hydroxyl group in the functional groups in the highly branched unsaturated polyester resin, a highly branched polyhydroxyl structure can be formed, which increases the binding force with the impregnating resin polymers and further improves its compatibility with a plurality of matrix resins commonly used in the field of impregnating coatings.

The dispersing resins according to the present application can be easily mixed with a plurality of matrix resins for preparing a universal color paste. When the viscosity is in the rage of 1000-2200 mPas, it can be ensured that the active ingredients can be evenly mixed with a plurality of matrix resins, while the viscosity can be prevented from becoming too high, reducing the difficulty for preparing a universal color paste.

In the present application, the ratio of the hydroxyl groups in the functional groups of the main chain of the highly branched unsaturated polyester resins is relatively high, so that it can form a highly branched polyhydroxyl structure and have a relatively strong binding force with a impregnating resin polymer.

The joint use of neopentyl glycol and ethylene glycol can provide a dispersing resin having good compatibility. It facilitates controlling the average molecular weight of the dispersing resin within 2000-5000, moving the molecular chain segments, and wrapping pigment particles. The branched molecular structure having multi-functionality provides best effect for wrapping pigment particles.

Further, by ensuring the ratio of the hydroxyl groups in the functional groups in the main chain of the highly branched unsaturated polyester resins as prepared, it can be ensured to form a highly branched polyhydroxyl structure and have a relatively strong binding force with the impregnating resin polymer.

The polymerization inhibitor can prevent the diol, the polyol, the aromatic dicarboxylic acid and the anhydride from polymerizing, thereby providing good polymerization inhibition effect, improving usage of resources, and reducing the cost, while ensuring the quality of the dispersing resins thus obtained.

Aromatic dicarboxylic acid and anhydride are one of the chain segments consisting the dispersing resin, which can provide a relatively high amount of ester bond in the main chain of the dispersing resin and further enhancing the binding force with the impregnating resin polymer.

In addition, incorporating a benzene ring into the main chain of the dispersing resin can enhance the color stability and heat resistance of the universal color paste. The reactive diluent can effectively dilute the highly branched unsaturated polyester resin and effectively adjust the viscosity of the materials.

In a second aspect, the present application provides a universal color paste used for impregnating coating, which is prepared from raw material including by weight parts: 20 parts of dispersing resin, 10-45 parts of filler, and 50-65 parts of reactive diluent. In one embodiment, the filler may be 10-20 parts of organic filler. In another embodiment, the filler may be 25-45 parts of inorganic filler.

Thus obtained universal color paste used for impregnating coating has good dispersivity and excellent stability.

In a third aspect, the present application provides a method for preparing a dispersing resin, comprising:

Step 1: introducing an inert gas into a reaction kettle, adding diol, polyol, aromatic dicarboxylic acid and anhydride into the reaction kettle, heating to a temperature of 180° C. under stirring and refluxing for 2-3 hours;

Step 2: heating to a temperature of 210-220° C. and performing distillation to remove excess water;

Step 3: lowering the temperature to 80° C., adding maleic anhydride, a polymerization inhibitor and an azeotropic solvent into the kettle, heating to a temperature range of 190-200° C., shutting off the inert gas, recycling the azeotropic solvent and collecting water in a water separator, while detecting the acid value in the reaction system until reaching an acid of lower than 10 mgKOH/g;

Step 4: performing vacuum distillation after collecting the water to remove the azeotropic solvent; and Step 5: lowering the temperature to 90° C., adding the reactive diluent, and stirring for 20-40 min to provide a finished product.

The method according to the present application is simple and applicable for large-scale production.

DESCRIPTION OF THE EMBODIMENTS

The present application will be further described in detail below in connection with examples.

Materials

| Material | Purity | Manufacturer |
| --- | --- | --- |
| Neopentyl glycol | Technical purity I | Guangzhou Henghu Trade Co., Ltd |
| Ethylene glycol | Technical purity I | Zhengzhou Shengba Chemical Products Co., Ltd |
| Glycerol | Technical purity I | Jinan Sanxiao Chemical Co., Ltd |
| Isophthalic acid | Technical purity I | Jinan Aoxing Chemical Co., Ltd |
| Maleic anhydride | Technical purity I | Jinan Tengbo Chemical Co., Ltd |
| P-benzoquinone | Technical purity I | Nanjing lanbai Chemical Co., Ltd |
| Xylene | Technical purity I | Ningbo Minxin Chemical Co., Ltd |
| Styrene | Technical purity I | Nantong Taichang Chemical Raw Material Co., Ltd |
| DPP Red | Technical purity I | Shenzhen Daxing Chemical Co., Ltd |
| Wollastonite | 800 mesh | Yuyao Jushi New Material Co., Ltd |
| Titanium white | 800 mesh | Henan Sanwei Chemical Products Co., Ltd |
| Calcium carbonate | 800 mesh | Lingshou Yuncheng Mineral Products Co., Ltd |
| Precipitated barium sulfate | 800 mesh | Zhejiang Changxing Hongyue Nonmetal Materials Co., Ltd |
| Phthalo blue | Technical purity I | Zhengzhou Baixiang Chemical Co., Ltd |
| Phthalo green | Technical purity I | Zhengzhou Baixiang Chemical Co., Ltd |
| Permanent violet | Technical purity I | Zhengzhou Zhongrun Chemical Products Co., Ltd |
| SL3012 electrical device pouring sealant | Technical purity I | Zhuzhou Shilin Polymer Co., Ltd |

EXAMPLES

Example 1 Preparation of a Dispersing Resin

Step 1: introducing nitrogen gas into a reaction kettle, sequentially adding 20 kg neopentyl glycol, 5 kg ethylene glycol, 5 kg glycerol, and 20 kg isophthalic acid into the kettle, heating to a temperature of 180° C. under stirring and refluxing for 2 hours;

Step 2: heating to a temperature of 220° C. and performing distillation to remove excess water;

Step 3: lowering the temperature to 80° C., adding 15 kg maleic anhydride, 0.02 kg p-benzoquinone and 6 kg xylene into the kettle, heating to a temperature range of 190-200° C., shutting off the nitrogen gas, recycling xylene, and collecting water in a water separator, while detecting the acid value in the reaction system until reaching an acid of lower than 10 mgKOH/g;

Step 4: performing vacuum distillation after collecting the water to remove the xylene; and Step 5: lowering the temperature to 90° C., adding 35 kg styrene, stirring for 30 min to dissolve unsaturated resin completely in the styrene, filtering, and filling.

Example 2

Example 2 differs from Example 1 in that 25 kg neopentyl glycol was added into the reaction kettle as a total amount of diol in Step 1.

Example 3

Example 3 differs from Example 1 in that 25 kg ethylene glycol was added into the reaction kettle as a total amount of diol in Step 1.

Example 4

Example 4 differs from Example 1 in that 10 kg neopentyl glycol was added into the reaction kettle as a total amount of diol in Step 1.

Example 5

Example 5 differs from Example 1 in that 30 kg neopentyl glycol was added into the reaction kettle as a total amount of diol in Step 1.

Example 6

Example 6 differs from Example 1 in that 20 kg styrene was added into the reaction kettle as a total amount of reactive diluent in Step 5.

Example 7

Example 7 differs from Example 1 in that 60 kg styrene was added into the reaction kettle as a total amount of reactive diluent in Step 5.

Example 8

Example 8 differs from Example 1 in that 10 kg glycerol was added into the reaction kettle as a total amount of polyol in Step 1.

Example 9

Example 9 differs from Example 1 in that 20 kg glycerol was added into the reaction kettle as a total amount of polyol in Step 1.

Example 10

Example 10 differs from Example 1 in that a total amount of 5 kg maleic anhydride was added in Step 3.

Example 11

Example 11 differs from Example 1 in that a total amount of 25 kg maleic anhydride was added in Step 3.

Example 12 Preparation of a Dispersing Resin

Step 1: introducing nitrogen gas into a reaction kettle, sequentially adding 15 kg neopentyl glycol, 10 kg ethylene glycol, 10 kg glycerol, and 25 kg isophthalic acid into the kettle, heating to a temperature of 180° C. under stirring and refluxing for 2 hours;
Step 2: heating to a temperature of 220° C. and performing distillation to remove excess water;
Step 3: lowering the temperature to 80° C., adding 10 kg maleic anhydride and 0.01 kg p-benzoquinone into the kettle, heating to a temperature range of 190-200° C., shutting off the nitrogen gas, adding 7 kg xylene, recycling the xylene and collecting water in a water separator, while detecting the acid value in the reaction system until reaching an acid of lower than 10 mgKOH/g;
Step 4: performing vacuum distillation after collecting the water to remove the xylene; and
Step 5: lowering the temperature to 90° C., adding 40 kg styrene, stirring for 30 min to dissolve unsaturated resin completely in the styrene, filtering, and filling.

Example 13 Preparation of a Dispersing Resin

Step 1: introducing nitrogen gas into a reaction kettle to remove oxygen, sequentially adding 18 kg neopentyl glycol, 7 kg ethylene glycol, 10 kg glycerol, and 25 kg isophthalic acid into the kettle, heating to a temperature of 180° C. under stirring and refluxing for 2 hours;
Step 2: heating to a temperature of 220° C. and performing distillation to remove excess water;
Step 3: lowering the temperature to 80° C., adding 8 kg maleic anhydride, 0.02 kg p-benzoquinone, and 5 kg xylene into the kettle, heating to a temperature range of 190-200° C., shutting off the nitrogen gas, recycling xylene and collecting water in a water separator, while detecting the acid value in the reaction system until reaching an acid of lower than 10 mgKOH/g;
Step 4: performing vacuum distillation after collecting the water to remove the xylene; and
Step 5: lowering the temperature to 90° C., adding 40 kg styrene, stirring for 30 min to dissolve unsaturated resin completely in the styrene, filtering, and filling.

Example 14 Preparation of a Dispersing Resin

Step 1: introducing nitrogen gas into a reaction kettle to remove oxygen, sequentially adding 15 kg neopentyl glycol, 10 kg ethylene glycol, 8 kg glycerol, and 15 kg isophthalic acid into the kettle, heating to a temperature of 180° C. under stirring and refluxing for 2 hours;
Step 2: heating to a temperature of 220° C. and performing distillation to remove excess water;
Step 3: lowering the temperature to 80° C., adding 12 kg maleic anhydride, 0.02 kg p-benzoquinone and 5 kg xylene into the kettle, heating to a temperature range of 190-200° C., shutting off the nitrogen gas, recycling xylene and collecting water in a water separator, while detecting the acid value in the reaction system until reaching an acid of lower than 10 mgKOH/g;
Step 4: performing vacuum distillation after collecting the water to remove the xylene; and
Step 5: lowering the temperature to 90° C., adding 35 kg styrene, stirring for 30 min to dissolve unsaturated resin completely in the styrene, filtering, and filling.

Example 15

A universal color paste used for a impregnating coating was prepared from 20 kg dispersing resin prepared in Example 1, 20 kg titanium white, and 60 kg styrene. The preparation method includes: introducing nitrogen gas into a reaction kettle, adding 20 kg dispersing resin prepared in Example 1 under stirring, adding 60 kg styrene and then 20 kg titanium white at a speed of 1 kg/min, filtering and filling to obtain the universal color paste used for a impregnating coating.

Example 16

Example 16 differs from Example 15 in that, 5 kg wollastonite and 5 kg titanium white were used in replace of 10 kg titanium white used in Example 15.

Example 17

Example 17 differs from Example 15 in that, 3.333 kg wollastonite, 3.333 kg titanium white and 3.333 kg calcium carbonate were used in replace of 10 kg titanium white used in Example 15.

Example 18

Example 18 differs from Example 15 in that, 2.5 kg wollastonite, 2.5 kg titanium white, 2.5 kg calcium carbonate and 2.5 kg precipitated barium sulfate were used in replace of 10 kg titanium white used in Example 15.

Example 19

A universal color paste used for a impregnating coating was prepared from 20 kg dispersing resin prepared in Example 1, 20 kg Phthalo blue and 60 kg styrene. The preparation method comprises: introducing nitrogen gas into a reaction kettle, adding 20 kg dispersing resin prepared in Example 1 under stirring, adding 60 kg styrene and then 20 kg Phthalo blue at a speed of 1 kg/min, filtering and filling to obtain the universal color paste A used for a impregnating coating.

Example 20

Example 20 differs from Example 19 in that 10 kg Phthalo blue and 10 kg DPP were used in replace of 20 kg Phthalo blue used in Example 19.

Example 21

Example 21 differs from Example 19 in that 6.667 kg Phthalo blue, 6.667 kg DPP, and 6.667 kg Phthalo green were used in replace of 20 kg Phthalo blue used in Example 19.

Example 22

Example 22 differs from Example 19 in that 5 kg Phthalo blue, 5 kg DPP, 5 kg Phthalo green and 5 kg permanent violet were used in replace of 20 kg Phthalo blue used in Example 19.

COMPARISON EXAMPLES

Comparison Example 1

Comparison Example 1 differs from Example 1 in that 4 kg glycerol was added into the reaction kettle in Step 1 as a total amount of polyol.

Comparison Example 2

Comparison Example 2 differs from Example 1 in that 25 kg glycerol was added into the reaction kettle in Step 1 as a total amount of polyol.

Comparison Example 3

Comparison Example 3 differs from Example 1 in that 8 kg isophthalic acid was added into the reaction kettle in Step 1 as a total amount of aromatic dicarboxylic acid and anhydride.

Comparison Example 4

Comparison Example 4 differs from Example 1 in that 35 kg isophthalic acid was added into the reaction kettle in Step 1 as a total amount of aromatic dicarboxylic acid and anhydride.

Comparison Example 5

Comparison Example 5 differs from Example 1 in that 10 kg styrene was added in Step 5 as a total amount of reactive diluent.

Comparison Example 6

Comparison Example 6 differs from Example 1 in that 70 kg styrene was added in Step 5 as a total amount of reactive diluent.

Comparison Example 7

Comparison Example 7 differs from Example 1 in that 8 kg neopentyl glycol was added into the reaction kettle in Step 1 as a total amount of diol.

Comparison Example 8

Comparison Example 8 differs from Example 1 in that 40 kg neopentyl glycol was added into the reaction kettle in Step 1 as a total amount of diol.

Comparison Example 9

Comparison Example 9 differs from Example 1 in that 4 kg maleic anhydride was added in Step 3.

Comparison Example 10

Comparison Example 10 differs from Example 1 in that 30 kg maleic anhydride was added in Step 3.

Comparison Example 11

A universal color paste used for a impregnating coating was prepared from 20 kg dispersing resin prepared in Comparison Example 1, 20 kg titanium white, and 60 kg styrene. The preparation method comprises: introducing nitrogen gas into a reaction kettle, adding 20 kg dispersing resin prepared in Comparison Example 1 under stirring, adding 60 kg styrene and then 20 kg titanium white at a speed of 1 kg/min, filtering and filling to obtain the universal color paste used for a impregnating coating.

Comparison Example 12

A universal color paste used for a impregnating coating was prepared from 20 kg dispersing resin prepared in Comparison Example 1, 20 kg DPP, and 60 kg styrene. The preparation method comprises: introducing nitrogen gas into a reaction kettle, adding 20 kg dispersing resin prepared in Comparison Example 1 under stirring, adding 60 kg styrene and then 20 kg DPP at a speed of 1 kg/min, filtering and filling to obtain the universal color paste used for a impregnating coating.

1. Performance Test

The dispersing resins prepared according to Examples 1-14 of the present application and Comparison Examples 1-10 were prepared into universal color pastes, and tested regarding relevant performances thereof for evaluating the obtained dispersing resins. The universal color pastes were made by the following steps.

Step 1: premixing the dispersing resins, the pigments and the reactive diluent at a high speed of stirring for 30 min to provide a semi-finished product; and Step 2: sand grinding the semi-finished products while monitoring the fineness thereof, stopping the grinding when the fineness was <5 μm, and measuring the viscosity of the semi-finished color pastes.

The pigments can be selected according to actual needs. For example, an inorganic pigment can be selected from the group consisting of titanium white, wollastonite, calcium carbonate, boron nitride, ferric yellow, precipitated barium sulfate, etc. An organic pigment can be selected from the group consisting of Phthalo blue, Phthalo green, DPP Red, and permanent violet. The weight parts or proportions of the universal color paints can be selected based on the kinds of the pigments, for example, being as follow:

| Dispersing resin | 20-30 parts | 20-35 parts |
|---|---|---|
| Organic pigment | 10-20 parts | / |
| Inorganic pigment | / | 25-45 parts |
| Reactive diluent | 50-65 parts | 20-30 parts |

The performances of the universal color paints were evaluated by dispersivity of pigments, viscosity of the color pastes, and the time stability of the color pastes. Color pastes were prepared by using the dispersing resins prepared according to Examples 1-14 and Comparison Examples 1-10, and were tested regarding the appearance, viscosity and fineness thereof at the beginning and after high temperature storage (30 days at 50° C.) and the longest storage period of individual color pastes before having a change in appearance when being stored at high temperature (50° C.). In particular, the appearance was evaluated via naked eyes; the viscosity was measured by using Brookfield Viscometer; and the fineness was measured by using QXD-50 single-groove grindometer available from Xiandai Environment.

2. Thermal Shock Test

Example Samples 1-14 and Comparison Samples 1-10 were prepared from 5 weight parts of the universal color pastes prepared from the dispersing resins prepared from Examples 1-14 and Comparison Examples 1-10 and 25 weight parts of SL3012 electrical device pouring sealant.

40 groups of test samples were prepared, each group of which included Example Samples 1-14 and Comparison Samples 1-10, and was subjected to the thermal shock test individually. The number of the thermal shock was increased gradually from the $1^{st}$ group to the $40^{th}$ group.

Firstly, the test samples were pre-treated, that is, being placed under a normal test atmosphere until reaching a stable temperature.

Secondly, initial detection was performed, that is, the test samples were compared with standard requirements, and the samples meeting the requirements were directly placed into a thermal shock chamber.

Then, each group of the test samples was subjected to a thermal shock test for one time, which included:

Step 1) placing the test samples into the chamber, raising the temperature in the chamber, and keeping the temperature for some time until the test samples reached a stable temperature;

Step 2) performing a low temperature shock, including transferring the test samples to a low temperature shock chamber at −40° C. within 5 min and keeping them in the chamber for 1 hour or until the test samples reached a stable temperature;

Step 3) performing a high temperature shock, including transferring the test samples to a high temperature shock chamber at 150° C. within 5 min and keeping them in the chamber for 1 hour or until the test samples reached a stable temperature;

4) repeating the thermal shock from Step 1) to Step 3) for desired times. It is to be noted that the time can be slightly adjusted according to the size of the samples or the volume of the space.

Secondly, the test samples were removed from the chamber, and placed under a normal test atmosphere so as to reach a stable temperature.

Finally, the test samples were detected regarding a cracking.

Table 1 shows whether the samples suffer from crack after being subjected to thermal shocks from −40° C. to 150° C.

3. Glass Transition Temperature (Tg) of the Test Samples

Glass transition temperature (Tg) refers to the transition temperature between glass state and rubber state of polymer materials. When the temperature is below Tg, the material is in glassy state in which the molecular chain and the chain segments can not move; while above Tg, the material is in rubber state in which the chain segments are moving. Mechanical and electrical properties of the material will change suddenly at Tg. Thus, Tg is an important indicator for the heat resistance of the material. The Tg values of the samples are listed in the last column of Table 3.

Test Method

TABLE 1

Performances of the color paste compositions prepared in Examples 1-7

|  | Example 1 | Example 2 | Example 3 | Example 4 | Example 5 | Example 6 | Example 7 |
|---|---|---|---|---|---|---|---|
| Acid value mgK0H/g | 9 | 8 | 8 | 4 | 9 | 6 | 6 |
| Viscosity after dilution | 2200 | 2000 | 2000 | 1600 | 2100 | 2400 | 1100 |
| Dispersion resin | 20 parts | 20 parts | 20 parts | 20 parts | 20 parts | 20 parts | 20 parts |
| DPP Red | 20 parts | 20 parts | 20 parts | 20 parts | 20 parts | 20 parts | 20 parts |
| Styrene | 60 parts | 60 parts | 60 parts | 60 parts | 60 parts | 60 parts | 60 parts |
| Initial appearance | Normal | Normal | Normal | Normal | Normal | Normal | Normal |
| Fineness (μm) | <5 | <5 | <5 | <5 | <5 | <5 | <5 |
| Initial viscosity | Normal | Normal | Normal | Normal | Normal | Normal | Normal |
| Appearance after storage | Normal | Normal | Normal | Normal | Normal | Normal | Normal |
| Fineness after storage | <5 μm | <5 μm | <5 μm | <5 μm | <5 μm | <5 μm | <5 μm |

TABLE 1-continued

Performances of the color paste compositions prepared in Examples 1-7

|  | Example 1 | Example 2 | Example 3 | Example 4 | Example 5 | Example 6 | Example 7 |
|---|---|---|---|---|---|---|---|
| Viscosity after storage | Normal | Normal | Normal | Normal | Normal | Normal | Normal |
| Longest storage period | 192 | 168 | 172 | 162 | 160 | 176 | 155 |
| 1-10 shocks | No | No | No | No | No | No | No |
| 10-20 shocks | No | No | No | No | No | No | No |
| 20-30 shocks | No | No | No | No | No | No | No |
| 30-40 shocks | No | No | No | No | No | No | No |
| Crackings during shock | 88 | 69 | 72 | 63 | 59 | 57 | 63 |
| Tg/° C. | 131.6 | 118.9 | 116.5 | 109.5 | 112.3 | 113.6 | 103.6 |

TABLE 2

Performance of the of the color paste compositions prepared in Examples 8-14

|  | Example 8 | Example 9 | Example 10 | Example 11 | Example 12 | Example 13 | Example 14 |
|---|---|---|---|---|---|---|---|
| Acid value mgKOH/g | 6 | 4 | 7 | 4 | 6 | 5 | 4 |
| Viscosity after dilution | 1600 | 1400 | 1900 | 1300 | 1800 | 2000 | 160 |
| Dispersing resin | 20 parts | 20 parts | 20 parts | 20 parts | 20 parts | 20 parts | 20 parts |
| DPP Red | 20 parts | 20 parts | 20 parts | 20 parts | 20 parts | 20 parts | 20 parts |
| Styrene | 60 parts | 60 parts | 60 parts | 60 parts | 60 parts | 60 parts | 60 parts |
| Initial appearance | Normal | Normal | Normal | Normal | Normal | Normal | Normal |
| Fineness (μm) | <5 | <5 | <5 | <5 | <5 | <5 | <5 |
| Initial viscosity | Normal | Normal | Normal | Normal | Normal | Normal | Normal |
| Appearance after storage | Normal | Normal | Normal | Normal | Normal | Normal | Normal |
| Fineness after storage | <5 μm | <5 μm | <5 μm | <5 μm | <5 μm | <5 μm | <5 μm |
| Viscosity after storage | Normal | Normal | Normal | Normal | Normal | Normal | Normal |
| Longest storage period | 165 | 170 | 158 | 177 | 189 | 185 | 188 |
| 1-10 shocks | No | No | No | No | No | No | No |
| 10-20 shocks | No | No | No | No | No | No | No |
| 20-30 shocks | No | No | No | No | No | No | No |
| 30-40 shocks | No | No | No | No | No | No | No |
| Crackings during shock | 72 | 67 | 71 | 69 | 85 | 83 | 85 |
| Tg | 117.3 | 113.3 | 103.8 | 115.3 | 128.9 | 127.5 | 128.5 |

TABLE 3

Performance of the color paste compositions prepared in Comparison Examples 1-5

|  | Comparison Example 1 | Comparison Example 2 | Comparison Example 3 | Comparison Example 4 | Comparison Example 5 |
|---|---|---|---|---|---|
| Acid value mgKOH/g | 4 | 5 | 6 | 4 | 6 |
| Viscosity after dilution | 1700 | 1800 | 1600 | 1400 | 2400 |
| Dispersing resin | 20 parts | 20 parts | 20 parts | 20 parts | 20 parts |
| DPP Red | 20 parts | 20 parts | 20 parts | 20 parts | 20 parts |
| Styrene | 60 parts | 60 parts | 60 parts | 60 parts | 60 parts |
| Initial appearance | Normal | Normal | Normal | Normal | Normal |
| Fineness (μm) | <5 | <5 | <5 | <5 | <5 |
| Initial viscosity | Normal | Normal | Normal | Normal | Normal |
| Appearance after storage | Severe settlement | Flocculation | Severe settlement | Flocculation | Severe settlement |
| Fineness after storage | >50 μm | >20 μm | >50 μm | >20 μm | >50 μm |
| Viscosity after storage | Thickening | Severe thickening | Thickening | Severe thickening | Thickening |
| Longest storage period | 36 | 41 | 45 | 43 | 36 |
| 1-10 shocks | No | Yes | No | No | No |
| 10-20 shocks | Yes | / | Yes | Yes | Yes |
| 20-30 shocks | / | / | No | / | / |
| 30-40 shocks | / | / | / | / | / |
| Crackings during shock | 13 | 8 | 16 | 13 | 11 |
| Tg ° C. | 87.6 | 84.1 | 91.2 | 88.5 | 92.3 |

TABLE 4

Performance of the color paste compositions prepared in Comparison Example 6-10

|  | Comparison Example 6 | Comparison Example 7 | Comparison Example 8 | Comparison Example 9 | Comparison Example 10 |
|---|---|---|---|---|---|
| Acid value mgK0H/g | 7 | 5 | 7 | 7 | 4 |
| Viscosity after dilution | 900 | 1700 | 2000 | 1600 | 1800 |
| Dispersing resin | 20 parts | 20 parts | 20 parts | 20 parts | 20 parts |
| DPP Red | 20 parts | 20 parts | 20 parts | 20 parts | 20 parts |
| Styrene | 60 parts | 60 parts | 60 parts | 60 parts | 60 parts |
| Initial appearance | Normal | Normal | Normal | Normal | Normal |
| Fineness (μm) | <5 | <5 | <5 | <5 | <5 |
| Initial viscosity | Normal | Normal | Normal | Normal | Normal |
| Appearance after storage | Severe settlement | Severe settlement | Flocculation | Severe settlement | Flocculation |
| Fineness after storage | >50 μm | >50 μm | >20 μm | >50 μm | >20 μm |
| Viscosity after storage | Thickening | Thickening | Severe thickening | Thickening | Severe thickening |
| Longest storage period | 33 | 38 | 39 | 46 | 43 |
| 1-10 shocks | Yes | Yes | Yes | No | Yes |
| 10-20 shocks | / | / | / | Yes | / |
| 20-30 shocks | / | / | / | / | / |
| 30-40 shocks | / | / | / | / | / |
| Crackings during shock | 7 | 9 | 6 | 15 | 8 |
| Tg | 90.5 | 88.9 | 87.6 | 93.2 | 92.5 |

TABLE 5

Testing parameters of Example Samples 1-14 and Comparison Samples 1-10

|  | 1-10 shocks | 10-20 shocks | 20-30 shocks | Crackings during shock | Tg/°C. |
|---|---|---|---|---|---|
| Example Sample 1 | Yes | Yes | Yes | 76 | 111.6 |
| Example Sample 2 | Yes | Yes | Yes | 63 | 101.9 |
| Example Sample 3 | Yes | Yes | Yes | 61 | 107.5 |
| Example Sample 4 | Yes | Yes | Yes | 59 | 103.5 |
| Example Sample 5 | Yes | Yes | Yes | 61 | 102.3 |
| Example Sample 6 | Yes | Yes | Yes | 59 | 103.6 |
| Example Sample 7 | Yes | Yes | Yes | 63 | 103.6 |
| Example Sample 8 | Yes | Yes | Yes | 69 | 107.3 |
| Example Sample 9 | Yes | Yes | Yes | 67 | 103.3 |
| Example Sample 10 | Yes | Yes | Yes | 71 | 103.8 |
| Example Sample 11 | Yes | Yes | Yes | 69 | 105.8 |
| Example Sample 12 | Yes | Yes | Yes | 73 | 109.9 |
| Example Sample 13 | Yes | Yes | Yes | 74 | 110.5 |
| Example Sample 14 | Yes | Yes | Yes | 71 | 108.8 |
| Comparison Example Sample 1 | Yes | Yes | No | 53 | 86.6 |
| Comparison Example Sample 2 | No | Yes | No | 45 | 84.1 |
| Comparison Example Sample 3 | Yes | Yes | No | 48 | 91.2 |
| Comparison Example Sample 4 | Yes | Yes | No | 46 | 88.5 |
| Comparison Example Sample 5 | Yes | Yes | No | 51 | 92.3 |
| Comparison Example Sample 6 | No | Yes | No | 48 | 90.5 |
| Comparison Example Sample 7 | No | Yes | No | 46 | 88.9 |
| Comparison Example Sample 8 | No | Yes | No | 43 | 87.6 |
| Comparison Example Sample 9 | Yes | Yes | No | 47 | 93.2 |
| Comparison Example Sample 10 | Yes | Yes | No | 48 | 92.5 |

TABLE 6

Testing parameters of Example Samples 15-22 and Comparison Samples 11-12

|  | Acid value and Viscosity after dilution | Initial appearance | Fineness and Initial viscosity | Appearance after storage and Fineness | Longest storage period |
|---|---|---|---|---|---|
| Comparison Example 11 | 4 mgK0H/g 1700 mPas | Normal | Normal; <5 μm | Severe settlement; >50 μm | 35 days |
| Comparison Example 12 | 5 mgK0H/g 1800 mPas | Normal | Normal; <5 μm | Severe settlement; >20 μm | 42 days |
| Example 15 | 9 mgK0H/g 2200 mPas | Normal | Normal; <5 μm | Normal; <5 μm | 188 days |
| Example 16 | 9 mgK0H/g 2200 mPas | Normal | Normal; <5 μm | Normal; <5 μm | 185 days |

TABLE 6-continued

Testing parameters of Example Samples 15-22 and Comparison Samples 11-12

|  | Acid value and Viscosity after dilution | Initial appearance | Fineness and Initial viscosity | Appearance after storage and Fineness | Longest storage period |
|---|---|---|---|---|---|
| Example 17 | 9 mgKOH/g 2200 mPas | Normal | Normal; <5 μm | Normal; <5 μm | 195 days |
| Example 18 | 9 mgKOH/g 2200 mPas | Normal | Normal; <5 μm | Normal; <5 μm | 192 days |
| Example 19 | 9 mgKOH/g 2200 mPas | Normal | Normal; <5 μm | Normal; <5 μm | 187 days |
| Example 20 | 9 mgKOH/g 2200 mPas | Normal | Normal; <5 μm | Normal; <5 μm | 188 days |
| Example 21 | 9 mgKOH/g 2200 mPas | Normal | Normal; <5 μm | Normal; <5 μm | 190 days |
| Example 22 | 9 mgKOH/g 2200 mPas | Normal | Normal; <5 μm | Normal; <5 μm | 183 days |

From Table 1 and Table 4, it can be seen that, the dispersing resins prepared in Examples 4 and 5 are superior in performance to those prepared in Comparison Examples 7 and 8, which shows that 10-30 weight parts of the diols in the product will be preferable. The dispersing resin prepared in Example 1 is superior in performance to those prepared in Examples 2-5, which shows that 20 weight parts of neopentyl glycol and 5 weight parts of ethylene glycol are preferable.

From Table 1, Table 4 and Table 5, it can be seen that the thermal shock resistance and the heat resistance of the pouring sealants prepared from the dispersing resins prepared in Example 4 and Example 5 are superior to those of the pouring sealants prepared from the dispersing resins prepared in Comparison Example 7 and Comparison Example 8. Therefore, preparing an electrical device pouring sealant from the dispersing resins according to the present application can improve the toughness and heat resistance of the pouring sealant. In particular, 20 weight parts of neopentyl glycol and 5 weight parts of ethylene glycol as a diol are preferable in the product.

From Table 1, Table 3 and Table 4, it can be seen that the dispersing resins prepared in Example 1, Example 6 and Example 7 are superior in performance to those prepared in Comparison Example 5 and Comparison Example 6. Therefore, 20-60 weight parts of reactive diluent in the product is preferable. The dispersing resin prepared in Example 1 is superior in performance to those prepared in Comparison Example 6 and Comparison Example 7. Therefore, 35 weight parts of styrene as reactive diluent in the product is preferable.

From Table 1, Table 4 and Table 5, it can be seen that the thermal shock resistance and the heat resistance of the pouring sealants prepared from the dispersing resins prepared in Example 1, Example 6 and Example 7 are superior to those of the pouring sealants prepared from the dispersing resins prepared in Comparison Example 5 and Comparison Example 6. Therefore, preparing an electrical device pouring sealant from the dispersing resins according to the present application can improve the toughness and heat resistance of the pouring sealant. In particular, 35 weight parts of styrene as a reactive diluent is preferable in the product.

From Table 1, Table 2 and Table 3, it can be seen that the dispersing resins prepared in Example 1, Example 8 and Example 9 are superior in performance to those prepared in Comparison Example 1 and Comparison Example 2. Therefore, 5-20 weight parts of polyol in the product is preferable. The dispersing resin prepared in Example 1 is superior in performance to those prepared in Comparison Example 8 and Comparison Example 9. Therefore, 5 weight parts of glycerol as polyol in the product is preferable.

From Table 1, Table 4 and Table 5, it can be seen that the thermal shock resistance and the heat resistance of the pouring sealants prepared from the dispersing resins prepared in Example 1, Example 8 and Example 9 are superior to those of the pouring sealants prepared from the dispersing resins prepared in Comparison Example 1 and Comparison Example 2. Therefore, preparing an electrical device pouring sealant from the dispersing resins according to the present application can improve the toughness and heat resistance of the pouring sealant. In particular, 5 weight parts of glycerol as a polyol is preferable in the product.

From Table 1, Table 2 and Table 3, it can be seen that the dispersing resins prepared in Example 1, Example 10 and Example 11 are superior in performance to those prepared in Comparison Example 1 and Comparison Example 2. Therefore, 5-25 weight parts of maleic anhydride in the product is preferable. The dispersing resin prepared in Example 1 is superior in performance to those prepared in Comparison Example 10 and Comparison Example 11. Therefore, 15 weight parts of maleic anhydride in the product is preferable.

From Table 1, Table 4 and Table 5, it can be seen that the thermal shock resistance and the heat resistance of the pouring sealants prepared from the dispersing resins prepared in Example 1, Example 10 and Example 11 are superior to those of the pouring sealants prepared from the dispersing resins prepared in Comparison Example 1 and Comparison Example 2. Therefore, preparing an electrical device pouring sealant from the dispersing resins according to the present application can improve the toughness and heat resistance of the pouring sealant. In particular, 15 weight parts of maleic anhydride is preferable in the product.

From Table 1 and Table 2, the performance of the dispersing resin prepared in Example 1 is similar to those prepared in Example 12, Example 13 and Example 14. Therefore, the formulations provided in Example 12, Example 13 and Example 14 can provide good quality product.

From Table 1, Table 4 and Table 5, it can be seen that the thermal shock resistance and the heat resistance of the pouring sealants prepared from the dispersing resins prepared in Example 1 are similar to those of the pouring sealants prepared from the dispersing resins prepared in Example 12, Example 13 and Example 14. Therefore, the formulations provided in Example 12, Example 13 and Example 14 can provide good quality product, and the heat resistance and the thermal shock resistance of the electrical device pouring sealants prepared by these products are improved.

From Table 6, it can be seen that the universal color pastes prepared in Examples 15-22 have a better storage performance than those prepared in Comparison Example 11 and Comparison Example 12. Therefore, the dispersing resins provided by the present application has excellent compatibility, and can be mixed with a plurality of organic pigments to prepare universal color pastes having good storage performance.

What is claimed is:

1. A method for preparing a dispersing resin, wherein the dispersing resin is prepared from a raw material including by weight parts: 10-30 parts of diol, 5-20 parts of polyol, 10-30 parts of aromatic dicarboxylic acid and anhydride, 5-25 parts of maleic anhydride, 0.01-0.1 parts of polymerization inhibitor, 20-60 parts of reactive diluent, and 1-10 parts of azeotropic solvent; the method comprising:

Step 1: introducing an inert gas into a reaction kettle, adding the diol, the polyol, the aromatic dicarboxylic acid and the anhydride into the reaction kettle, heating to a temperature of 180° C. under stirring and refluxing for 2-3 hours;

Step 2: heating to a temperature of 210-220° C. and performing distillation to remove excess water;

Step 3: lowering the temperature to 80° C., adding the maleic anhydride, the polymerization inhibitor and the azeotropic solvent into the kettle, heating to a temperature range of 190-200° C., shutting off the inert gas, recycling the azeotropic solvent and collecting water in a water separator, while detecting the acid value in the reaction system until reaching an acid value of lower than 10 mgKOH/g;

Step 4: performing vacuum distillation after collecting the water to remove the azeotropic solvent; and Step 5: lowering the temperature to 90° C., adding the reactive diluent, and stirring for 20-40 min to provide a finished product.

* * * * *